(12) United States Patent
Dove et al.

(10) Patent No.: US 6,169,749 B1
(45) Date of Patent: Jan. 2, 2001

(54) METHOD OF SEQUENCING TIME DIVISION MULTIPLEX (TDM) CELLS IN A SYNCHRONOUS OPTICAL NETWORK (SONET) FRAME

(75) Inventors: Jason W. Dove, Novato; Rodney Witel, Rohnert Park; Brian Semple, Novato, all of CA (US)

(73) Assignee: Alcatel USA Sourcing L.P., Plano, TX (US)

( * ) Notice: Under 35 U.S.C. 154(b), the term of this patent shall be extended for 0 days.

(21) Appl. No.: 08/993,551

(22) Filed: Dec. 18, 1997

(51) Int. Cl.[7] .................. H04J 3/16; H04J 3/24; H04J 3/00; H04J 3/18
(52) U.S. Cl. .................. 370/474; 370/471; 370/473; 370/476
(58) Field of Search .................. 370/352, 395, 370/471, 473, 474, 476, 399, 509, 537

(56) References Cited

U.S. PATENT DOCUMENTS

| | | |
|---|---|---|
| 5,495,478 | 2/1996 | Wilkinson et al. .......... 370/58.2 |
| 5,526,349 | 6/1996 | Diaz et al. .......... 370/58.1 |
| 5,528,592 | 6/1996 | Schibler et al. .......... 370/60.1 |
| 5,537,400 | 7/1996 | Diaz et al. .......... 370/58.2 |
| 5,568,482 | * 10/1996 | Li et al. .......... 370/471 |
| 5,592,480 | 1/1997 | Carney et al. .......... 370/347 |
| 5,612,958 | 3/1997 | Sannino .......... 370/394 |
| 5,623,491 | 4/1997 | Skoog .......... 370/397 |
| 5,629,937 | 5/1997 | Hayter et al. .......... 370/233 |
| 5,664,114 | 9/1997 | Krech, Jr., et al. .......... 395/200.64 |
| 5,671,249 | 9/1997 | Andersson et al. .......... 375/211 |
| 5,889,773 | * 3/1999 | Stevenson, III .......... 370/352 |
| 6,023,467 | * 3/1999 | Abdelhamid et al. .......... 370/395 |

* cited by examiner

Primary Examiner—Chi H. Pham
Assistant Examiner—Brenda H. Pham
(74) Attorney, Agent, or Firm—Fliesler Dubb Meyer & Lovejoy LLP

(57) ABSTRACT

A method of sequencing a plurality of cells in a superframe consisting of a plurality of frames in a temporal sequence comprises the steps of assigning one of the frames as a marker frame, assigning one of the time multiplexed cells in the marker frame as a marker cell, and coding the header bytes in the marker cell with header data. Alternatively, each of the time multiplexed cells may contain the header data without designating a marker cell.

59 Claims, 3 Drawing Sheets

US 6,169,749 B1

METHOD OF SEQUENCING TIME DIVISION MULTIPLEX (TDM) CELLS IN A SYNCHRONOUS OPTICAL NETWORK (SONET) FRAME

BACKGROUND OF THE INVENTION

1. Field of the Invention

The present invention relates to a method of sequencing a plurality of cells in a temporal frame, and more particularly, to a method of sequencing a plurality of time division multiplex (TDM) cells in a synchronous optical network (SONET) frame.

2. Background

The telecommunications industry has developed schemes for transmitting telephony signals, which are usually in the form of time division multiplex (TDM) signals that have been formatted into asynchronous transfer mode (ATM) cells over a physical layer interface, such as a synchronous optical network (SONET) interface. The SONET uses an industry-standard framed transmission format in which signals are transmitted in SONET superframes each having a duration of 1 ms. Each SONET superframe is divided into 8 SONET frames each having a duration of 125 $\mu$s. Each SONET frame includes a plurality of cells each adapted to carry data in the ATM format. Digital video signals and computer data signals are usually carried in the ATM format whereas telephony signals are usually carried in the TDM format. Systems and methods have been developed to carry both telephony and digital video signals over the same communications network. Methods have been developed to convert the TDM format into the ATM format such that both telephony and digital video signals can be transmitted over a single physical layer interface.

However, when the SONET frames are received by a SONET octal bus over a plurality of ports, address collisions may occur between cells of different SONET frames. For example, if a TDM cell in a frame overlaps with another TDM cell in an adjacent frame when received by a receive interface such as a SONET octal bus, an address collision occurs which causes jitters that are undesirable for the demultiplexing of the TDM signals. Therefore, there is a need for a method of sequencing the TDM cells in the SONET frames to avoid an address collision between the TDM cells of different frames.

SUMMARY OF THE INVENTION

In view of the above problem, the present invention provides a method of sequencing a plurality of time multiplexed cells in temporal frames by assigning a marker frame and a marker cell within the marker frame coded with header data. The method according to the present invention is able to avoid an address collision between the time multiplexed cells in adjacent frames. The method of sequencing a plurality of cells in a superframe consisting of a plurality of frames in a temporal sequence roughly comprises the steps of:

(a) assigning one of the frames as a marker frame, the marker frame including a plurality of time multiplexed cells and a plurality of asynchronous cells;

(b) assigning one of the time multiplexed cells in the marker frame as a marker cell, the marker cell including a plurality of header bytes and a plurality of payload bytes; and (c) coding the plurality of header bytes with header data.

In a further embodiment, the last frame in the superframe is assigned as the marker frame, and the first time multiplexed cell in the marker frame is assigned as the marker cell. The marker cell, which includes a plurality of header bytes and payload bytes, is coded with a frame number for referencing the order of the marker frame within the superframe, a cell number for referencing the order of the marker cell within the marker frame, a frame frequency marker, a time multiplexed cell indicator and a packed mode indicator.

In another embodiment, a marker cell is not necessary to designate a particular cell sequence. An encoded sequence of header bits is used instead to identify any of the TDM cells in the cell slot sequence. Moreover, the header bits may include upstream and downstream identifier bits to signify the direction in which the TDM cell is conveyed, thus allowing cross connections to occur between transmit and receive physical layer interfaces.

Advantageously, the method according to the present invention satisfies the need for designating a particular frame in a superframe and a particular time multiplexed cell in the marker frame as a marker cell, such that when the superframes are received by a receive interface such as a SONET octal bus, the marker frame within each SONET superframe and the marker cell within each marker frame can be identified to maintain a proper temporal sequence of the SONET frames and the cells within the frames. A further advantage of the present invention is that the header data identifying the marker cell, the marker frame, and the format of the marker cell can be coded into the existing header bits of the marker cell without requiring the provision of additional header bits or otherwise displacing some of the payload bits that are used for carrying information.

BRIEF DESCRIPTION OF THE DRAWINGS

The invention will be described with respect to particular embodiments thereof, and references will be made to the drawings in which.

DETAILED DESCRIPTION

The present invention provides a method of sequencing a plurality of time multiplexed cells, such as time division multiplexed (TDM) cells in temporal frames such as synchronous optical network (SONET) frames, by assigning one of the frames in a SONET superframe as a marker frame, assigning one of the time multiplexed cells in the marker frame as a marker cell which includes a plurality of header bytes and payload bytes, and coding the header bytes with header data. The method according to the present invention allows a receive interface, such as a SONET octal bus in a SONET communication system, to detect the marker frame in each SONET superframe for the synchronization of the SONET frames, and to detect the marker cell in each marker frame to synchronize the cells in the marker frame to allow for proper sequencing of the TDM cells in their assigned cell slots when the cells are received by the SONET receive interface. An industry-standard SONET superframe has a duration of 1 ms and consists of 8 SONET frames each having a duration of 125 $\mu$s. The SONET frames are usually received by a SONET receive interface, for example, an octal bus through a plurality of single-port queues, with a possibility of a temporal overlap of at least some of the cells in the adjacent frames when they are received by the receive interface. The method according to the present invention is able to allow the receive interface to avoid a potential collision of data addresses of TDM cells of different frames by detecting the marker frame within each superframe and by detecting the marker cell within each marker frame.

Figure 1:
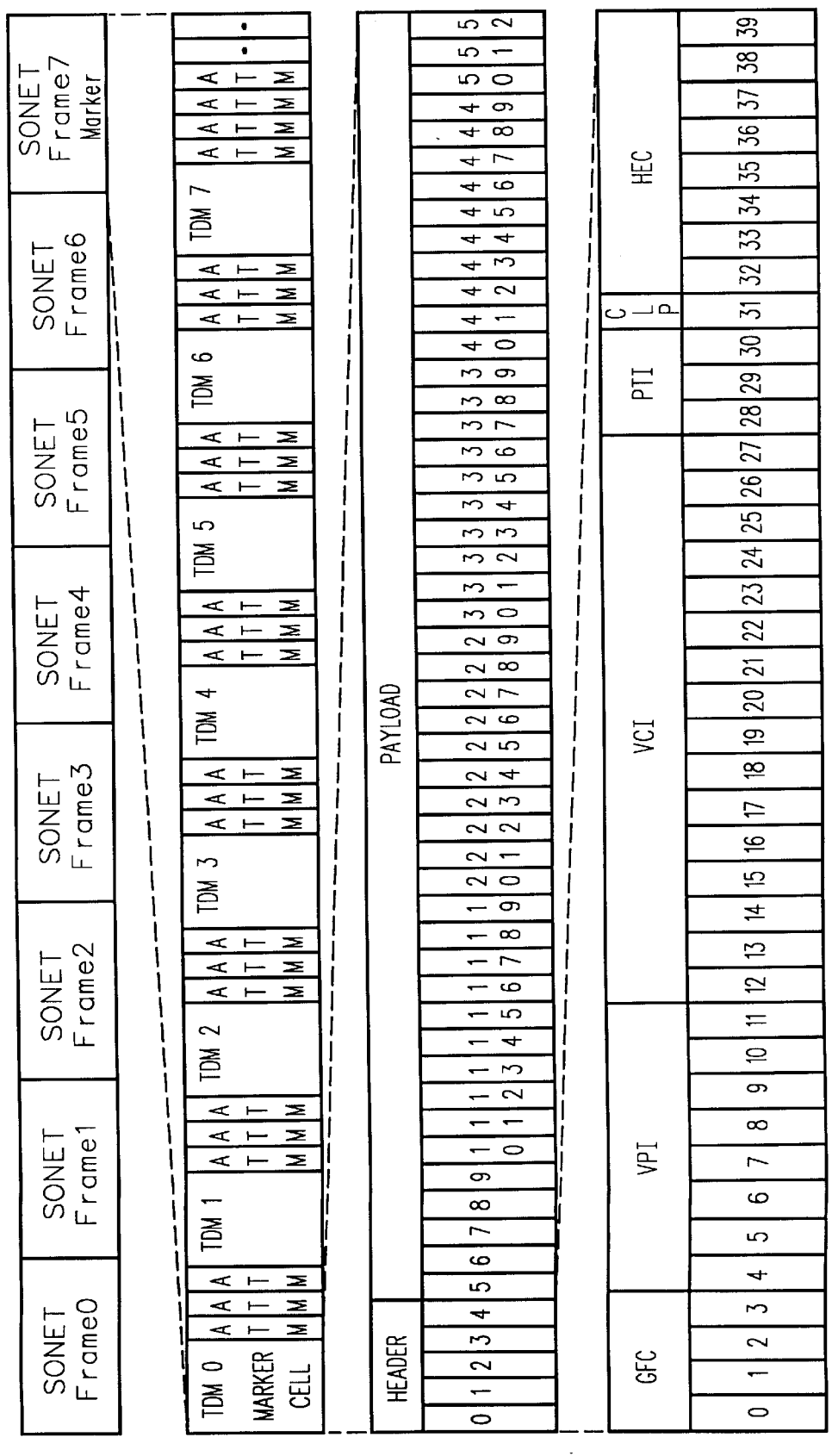
FIG. 1 is a diagram illustrating the sequencing of time division multiplex (TDM) cells in a synchronous optical network (SONET) frame in accordance with the present invention.

An industry-standard SONET frame, which has a duration of 125 μs, contains 44 asynchronous transfer mode (ATM) cells at ECR 3, or 88 ATM cells at ECR 6, or 176 ATM cells at ECR 12. "ECR" stands for "effective cell rate" and is an industry-standard term which is known to a person skilled in the art for denoting the rate of cell transmission. FIG. 1 shows a diagram illustrating an example of the sequencing of TDM cells in SONET frames by assigning the last SONET frame, designated as SONET Frame 7, as the marker frame, and the first TDM cell in the marker frame, designated as TDM 0, as the marker cell. The use of the last frame in each SONET superframe as the marker frame may be convenient in that it provides a timed reference at the end of each SONET superframe. Alternatively, another frame in the SONET superframe sequence may be used as the marker frame as long as the frames with the same frame number in different SONET superframes are consistently assigned as the marker frames such that the marker frames each designate a specific position in the sequence of the superframes. It is also convenient to assign the first time multiplexed cell in the marker frame as the marker cell because if there is a temporal overlap between the boundaries of adjacent frames, it is likely that the first cell in the cell sequence of a subsequent frame will arrive at the receive interface simultaneously with one of the cells in the previous frame. The marker cell includes a plurality of header bits, at least some of which are coded with header data including the marker frame number and the marker cell number. If the first time multiplexed cell in the marker frame is assigned as the marker cell, the coded header data in the marker cell allows the receive interface to identify the marker cells such that a proper receive queue can be maintained.

As shown in FIG. 1, SONET Frame 7 has a plurality of cell slots arranged in such a manner that a plurality of time multiplexed cells are interspersed from each other by a fixed number of asynchronous cells, for example, 3 asynchronous cells, with the frame sequence starting with the first time multiplexed cell, designated as TDM 0, occupying the first cell slot in SONET Frame 7. In the example illustrated in FIG. 1, 8 TDM cells, numbered consecutively from TDM 0 to TDM 7, with the adjacent TDM cells interspersed from each other by 3 ATM cells, occupy the cell slots in an earlier part of the cell slot sequence in SONET Frame 7. The sequence of cell slots to which the TDM cells are assigned is followed by a plurality of ATM cells which occupy the cell slots in the later part of the cell slot sequence in SONET Frame 7. When only asynchronous cells such as ATM cells are assigned to the cell slots later in the sequence in each SONET frame, an address collision between the time multiplexed cells of adjacent frames may be avoided if the first time multiplexed cell in a subsequent frame overlaps with one of the asynchronous cells assigned to the cell slots later in the sequence in the immediately preceding frame. For example, the cell slots from TDM 0 to TDM 7 including the ATM cells interspersed between the TDM cells may be assigned to the cell slots occupying a first portion in the earlier sequence in the SONET frame such that the total duration of the cell slot sequence from TDM 0 to TDM 7 is no more than ¾ of the SONET frame duration, which is 125 μs. The arrangement of TDM cells with the assignment of the first TDM cell, designated as TDM 0, as the marker cell is only one example of arrangements of TDM cells within a SONET frame to which the method according to the present invention may be applied. Other TDM cell arrangements are also possible.

An industry-standard TDM cell which has been converted into an ATM format for transmission in a SONET frame has 53 bytes of data including 5 header bytes and 48 payload bytes. The conversion of TDM data into an ATM format and the placement of a TDM cell in a standard SONET ATM cell slot can be achieved by conventional methods which are known to a person skilled in the art. In the example shown in FIG. 1, the header bytes in the marker cell has 5 header bytes numbered consecutively from 0 to 4 and 48 payload bytes numbered consecutively from 5 to 52. Each cell slot has a duration of 2.72 μs at ECR 3, 1.360 μs at ECR 6, or 680 ns at ECR 12.

The header bytes are used for the coding of header data whereas the payload bytes can be coded with digital information. The 5 header bytes consist of 40 header bits numbered consecutively from 0 to 39 as shown in FIG. 1. In an industry-standard ATM cell, the header bits are assigned different functions with some of the header bits reserved as empty bits at the present time. Header bits 0–3 are designated as generic flow control (GFC) bits, header bits 4–11 are designated as virtual path identifier (VPI) bits, header bits 12–27 are designated as virtual channel indicator (VCI) bits, header bits 28–30 are designated as payload type identifier (PTI) bits, header bit 31 is designated as cell loss priority (CLP) bit, and header bits 32–39 are designated as header error checksum (HEC) bits. GFC, VPI, VCI, PTI, CLP and HEC are industry-standard terms known to a person skilled in the art. Since some of these header bits are empty bits at the present time and are reserved for additional header information whenever such a need arises, these empty bits can be programmed for carrying information such as the marker frame number designating the order of the marker frame in the frame sequence of the superframe and the marker cell number designating the order of the marker cell in the cell slot sequence of the marker frame. Furthermore, one of the header bits can be coded as a frame frequency marker, such as a 1 KHz marker for a standard SONET frame. Another header bit can be coded as a time multiplexed cell indicator for indicating whether the marker cell is a time multiplexed cell, and yet another header bit can be coded as a packed mode indicator for indicating whether the marker cell is in a packed mode.

In the embodiment illustrated in FIG. 1, header bits 4–7, which are the first 4 bits of the VPI bits, are assigned to carry the frame number for referencing the order of the marker frame in the SONET superframe, for example, Frame 7 as the last frame in the SONET superframe. Header bits 8–11, which are the next 4 bits of the VPI bits, are assigned to carry the cell number for referencing the position of the marker cell, in this example the first cell slot designated as TDM 0, to indicate the order of the marker cell in the marker frame. The frame frequency marker, in this case the 1 KHz marker, is assigned to header bit 12, which is the first bit of the VCI bits. The time multiplexed cell indicator, or the TDM indicator in this case, is assigned to header bit 13, which is the second bit of the VCI bits. The time multiplexed cell indicator signifies to the receive interface that the marker cell contains TDM data converted into the ATM format, for example, digital telephony data, rather than a standard ATM cell which carries original data in the ATM format, for example, digital video data. The packed mode indicator may be assigned to header bit 27, which is the last bit of the VCI bits, to indicate whether the marker cell, which is a time multiplexed cell, is in a packed or unpacked mode.

In the example illustrated in FIG. 1 and described above, the TDM cells are in an unpacked mode, which means that only one TDM cell occupies a standard ATM cell slot. In a packed mode, more than one TDM cell of data may be carried in a standard ATM cell. For example, a standard ATM cell slot is known to be able to carry 1.5 TDM cells of data, and the method of packing 1.5 TDM cells into one ATM cell slot is conventional and known to a person skilled in the art.

The assignment of the frame number, the cell number, the frame frequency marker, the time multiplexed cell indicator, and the packed mode indicator to the particular bits described above is only one example of coding the existing empty header bits to designate the marker frame, the marker cell, and the characteristics of the marker cell. However, the present invention is not limited to the assignment of header data to these particular bits. Assignment of the header data to other bits are also possible.

Figure 2A:
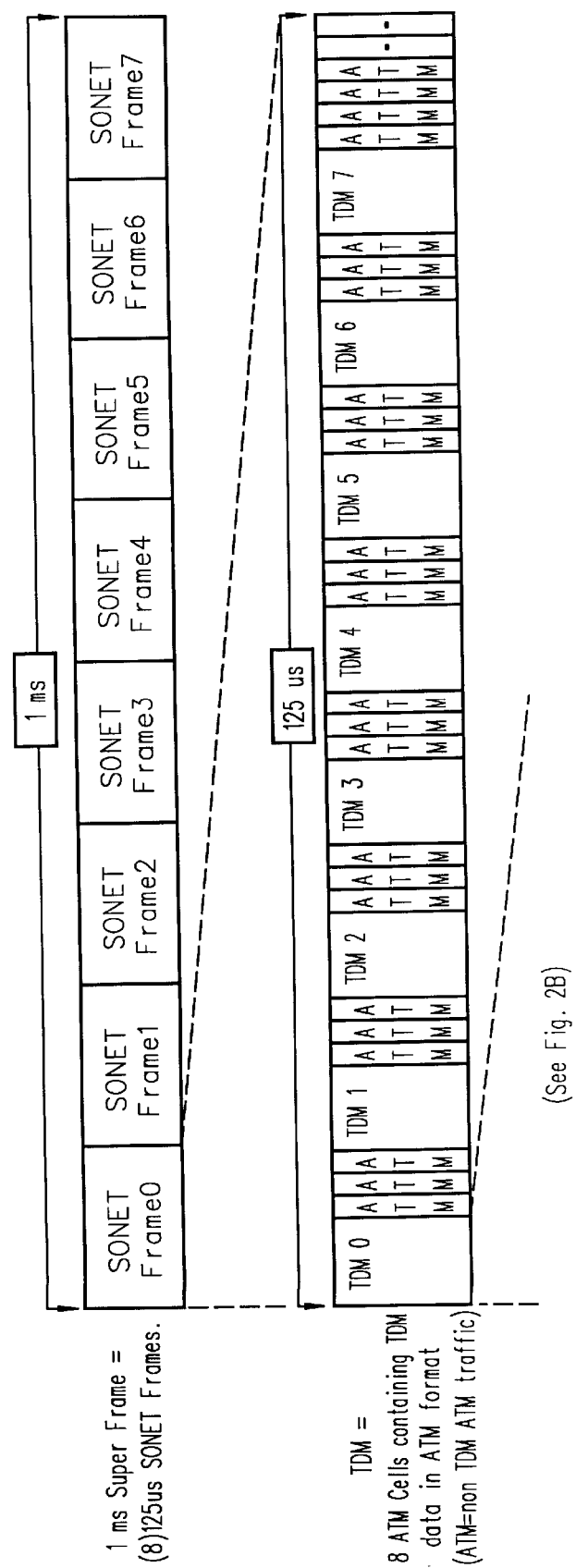
FIG. 2 is a diagram illustrating an embodiment of coding the header bits in accordance with the present invention.
Figure 2B:
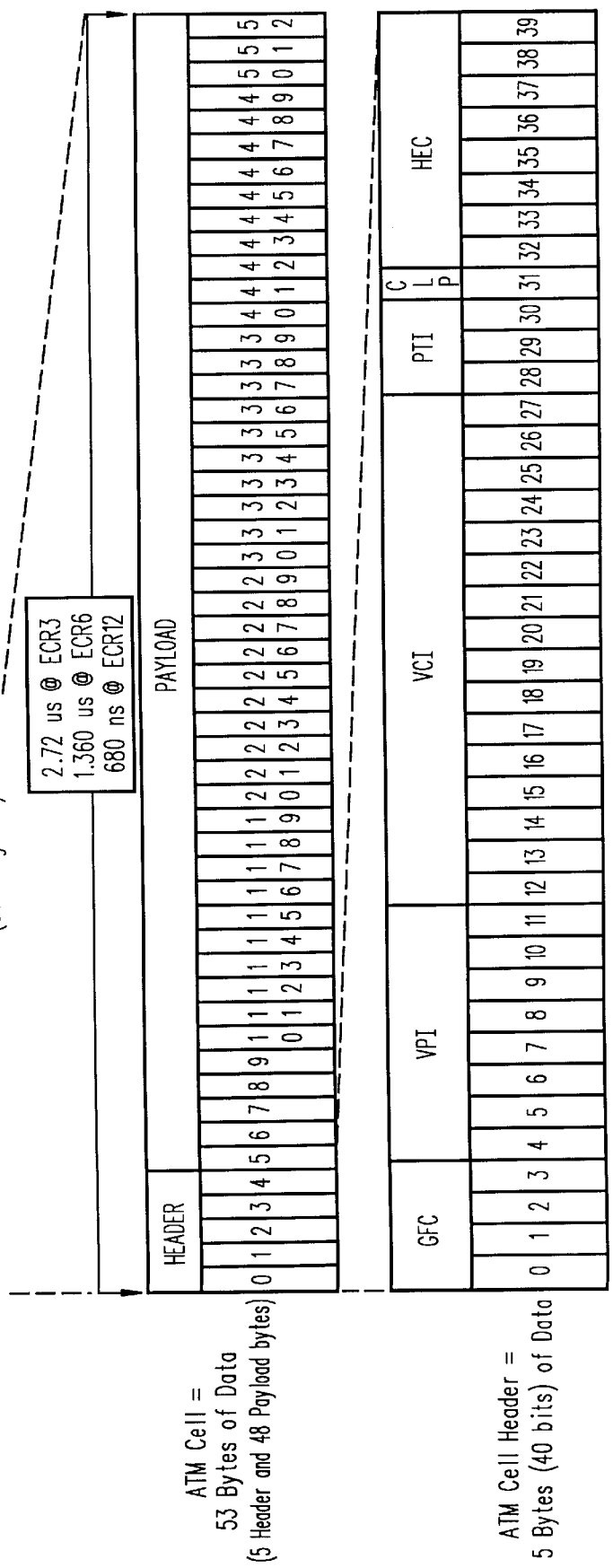

FIG. 2 shows a diagram illustrating another embodiment of the sequencing of TDM cells in SONET frames in which a marker cell need not be designated within a SONET frame to sequence the TDM cells. An encoded sequence of header bits is instead used for identifying the TDM cells within a SONET frame and the sequence of the SONET frames within a superframe. One of the SONET frames, for example, SONET Frame 0, includes a plurality of TDM cells, for example, eight TDM cells numbered consecutively from TDM 0 to TDM 7 interspersed by a plurality of ATM cells. Each TDM cell, for example, the cell designated as TDM 0, contains a plurality of header bytes and payload bytes. An industry-standard ATM cell containing TDM data converted into the ATM format includes five header bytes numbered consecutively from 0 to 4 and 48 payload bytes numbered consecutively from 5 to 52. The five header bytes consist of 40 header bits numbered consecutively from 0 to 39. Header bits 0–3 are the GFC bits, header bits 4–11 are the VPI bits, header bits 12–27 are the VCI bits, header bits 28–30 are the PTI bits, header bit 31 is the CLP bit, and header bits 32–39 are the HEC bits.

In this embodiment, one of the header bits is assigned as a delay control bit, which signifies to a queuing apparatus in a SONET communication system with a plurality of physical layer interfaces whether the start of the cell sequence needs to be delayed. For example, header bit 0, which is the first bit of the GFC bits, can be assigned as the delay control bit. The assignment of header bit 0, which is the first bit of the first TDM cell in a SONET frame, as the delay control bit allows the queuing apparatus in the SONET communication system to decide whether this particular SONET frame needs to be delayed prior to reception by a SONET receiver, for example, a SONET octal bus receive interface. Furthermore, three of the header bits may be assigned as TDM frame bits for referencing the frame number of the SONET frame in which the TDM cell coded with the header information is contained in the SONET frame sequence. For example, header bits 13, which are the next three bits of the GFC bits, can be designated as the frame bits for carrying the frame number.

Four of the header bits can be assigned as upstream identifier bits which are coded with information identifying whether the data in the TDM cell are conveyed in an upstream direction, and the location of the cell slot to which the TDM cell is assigned in the cell sequence within the SONET frame. For example, header bits 4–7, which are the first four bits of the VPI bits, can be assigned as the upstream identifier bits. Another four of the header bits, for example, header bits 8–11, which are the next four bits of the VPI bits, can be assigned as downstream identifier bits which are designated to carry information identifying whether the data in the TDM cell are conveyed in a downstream direction, and the location of the cell slot to which the TDM cell containing the header data is assigned in the cell sequence within the SONET frame.

The upstream and downstream identifier bits signify to a multi-port physical layer interface in the SONET communication system the position of the TDM cell in the cell slot sequence in the upstream and downstream directions, respectively. In this embodiment, the method according to the present invention allows cross connections to occur between the transmit and receive physical layer interfaces since the TDM cells are each identified by separate upstream and the downstream identifier bits. The upstream and downstream identifier bits, which can be coded with different numbers identifying whether the TDM cell is conveyed in an upstream or downstream direction, make it apparent to the physical layer interface whether the TDM cell is to be transmitted upstream or downstream, respectively, even when cross connections are implemented between the transmit and receive physical layer interfaces.

At least some of the remaining header bits can be coded with additional header data for identifying the characteristics of the TDM cell. For example, one of the header bits can be assigned as a TDM cell indicator bit which indicates that the ATM cell slot contains one cell of TDM data converted into the ATM format, rather than an ATM cell that contains original ATM data. For example, header bit 12, which is the first bit of the VCI bits, can be assigned as the TDM cell indicator bit. The TDM cell indicator bit allows a SONET receiver to determine whether the cell which includes the header information contains TDM data converted into the ATM format, for example, digital telephony data, or standard ATM data that have not been converted from the TDM format, for example, digital video data. As illustrated in FIG. 2, header bits 13–27, which belong to the VCI bits, header bits 28–30, which are the PTI bits, and header bit 31, which is the CLP bit, are unused bits at the present time. These bits can be coded with additional header data whenever such a need arises. Header bits 32-39, which are the HEC bits, can be used as error checking bits for the header bits 031. These error checking bits may be parity bits used for detecting errors in the header bits 0–31 by adding at least some of the header bits. For example, block coding and decoding schemes may be used for checking errors in header bits 0–31 by assigning some of the error checking bits as row parity bits and other error checking bits as column parity bits.

An advantage of the embodiment illustrated in FIG. 2 and described above is that a marker cell is no longer necessary to designate a particular TDM cell in the cell slot sequence within a SONET frame. Instead, an encoded sequence of header bits is implemented to identify the TDM cell and the SONET frame in which the header data are contained. A further advantage of this embodiment is that each TDM cell is provided with separate upstream and downstream identifier bits such that the direction of data flow, either in an upstream direction or a downstream direction, is known. This allows cross connections to occur between the multi-port transmit and receive physical layer interfaces because the direction of the TDM data flow is clearly identified. Although FIG. 2 illustrates the coding of particular header bits for carrying header information such as the upstream identifier, the downstream identifier and the TDM cell indicator, the present invention is not limited to the assignment of the header data to these particular bits. Assignment of the header data to other unused bits, for example, header bits 13–31, are also possible.

In the embodiments described above, a number of assumptions were made in order to simplify the description of the method in view of the existing industry-standard communications interfaces and formats. For example, it was assumed that the temporal frames are SONET frames, that the time multiplexed cells are TDM cells, and that the asynchronous cells are ATM cells. Furthermore, it was assumed that the last SONET frame in the superframe is assigned as the marker frame, that the first TDM cell in the marker frame is assigned as the marker cell, and that particular header bits are assigned to carry specific header information. However, none of these assumptions are mandatory in a different embodiment. It will be appreciated that the method of the present invention is also applicable to the sequencing of cells in temporal frames that use other transmission formats, either presently available or to be developed in the future. The principles of the invention would nonetheless still apply.

The invention has been described with respect to particular embodiments thereof, and numerous modifications can be made which are within the scope of the invention as set forth in the claims.

What is claimed is:

1. A method of sequencing a plurality of cells in a superframe consisting of a plurality of frames in a temporal sequence, the method comprising the steps of:
    (a) assigning one of the frames as a marker frame, the marker frame including a plurality of time multiplexed cells and a plurality of asynchronous cells;
    (b) assigning one of the time multiplexed cells in the marker frame as a marker cell, the marker cell including a plurality of header bytes and a plurality of payload bytes; and
    (c) coding the plurality of header bytes with header data, wherein the header data include:
        (i) a frame number for referencing the marker frame;
        (ii) a cell number for referencing the marker cell;
        (iii) a frame frequency marker;
        (iv) a time multiplexed cell indicator for indicating whether the marker cell is a time multiplexed cell; and
        (v) a packed mode indicator for indicating whether the marker cell is in a packed mode.
    wherein the plurality of header bytes comprise 40 bits sequenced consecutively from header bit 0 to header bit 39,
    the step of coding the plurality of header bytes including the step of assigning the cell number to header bits 4–7.

2. The method of claim 1, wherein the plurality of frames include a last frame in the sequence, and the step of assigning one of the frames comprises the step of assigning the last frame as the marker frame.

3. The method of claim 1, wherein at least some of the plurality of asynchronous cells are temporally interspersed between the plurality of time multiplexed cells.

4. The method of claim 1, wherein the plurality of time multiplexed cells include a first time multiplexed cell in the marker frame, and the step of assigning one of the time multiplexed cells comprises the step of assigning the first time multiplexed cell as the marker cell.

5. The method of claim 1, wherein the plurality of frames comprise a plurality of synchronous optical network (SONET) frames.

6. The method of claim 1, wherein the plurality of asynchronous cells comprise a plurality of asynchronous transfer mode (ATM) cells.

7. The method of claim 1, wherein the plurality of time multiplexed cells comprise a plurality of time division multiplex (TDM) cells.

8. The method of claim 1, wherein the plurality of header bytes comprise five header bytes.

9. A method of sequencing a plurality of cells in a superframe consisting of a plurality of frames in a temporal sequence, the method comprising the steps of:
    (a) assigning one of the frames as a marker frame, the marker frame including a plurality of time multiplexed cells and a plurality of asynchronous cells;
    (b) assigning one of the time multiplexed cells in the marker frame as a marker cell, the marker cell including a plurality of header bytes and a plurality of payload bytes; and
    (c) coding the plurality of header bytes with header data, wherein the header data include:
        (i) a frame number for referencing the marker frame;
        (ii) a cell number for referencing the marker cell;
        (iii) a frame frequency marker;
        (iv) a time multiplexed cell indicator for indicating whether the marker cell is a time multiplexed cell; and
        (v) a packed mode indicator for indicating whether the marker cell is in a packed mode,
    wherein the plurality of header bytes comprise 40 bits sequenced consecutively from header bit 0 to header bit 39,
    the step of coding the plurality of header bytes including the step of assigning the frame number to header bits 8–11.

10. A method of sequencing a plurality of cells in a superframe consisting of a plurality of frames in a temporal sequence, the method comprising the steps of:
    (a) assigning one of the frames as a marker frame, the marker frame including a plurality of time multiplexed cells and a plurality of asynchronous cells;
    (b) assigning one of the time multiplexed cells in the marker frame as a marker cell, the marker cell including a plurality of header bytes and a plurality of payload bytes; and
    (c) coding the plurality of header bytes with header data, wherein the header data include:
        (i) a frame number for referencing the marker frame;
        (ii) a cell number for referencing the marker cell;
        (iii) a frame frequency marker;
        (iv) a time multiplexed cell indicator for indicating whether the marker cell is a time multiplexed cell; and
        (v) a packed mode indicator for indicating whether the marker cell is in a packed mode,
    wherein the plurality of header bytes comprise 40 bits sequenced consecutively from header bit 0 to header bit 39,
    the step of coding the plurality of header bytes including the step of assigning the frame frequency marker to header bit 12.

11. A method of sequencing a plurality of cells in a superframe consisting of a plurality of frames in a temporal sequence, the method comprising the steps of:
    (a) assigning one of the frames as a marker frame, the marker frame including a plurality of time multiplexed cells and a plurality of asynchronous cells;

(b) assigning one of the time multiplexed cells in the marker frame as a marker cell, the marker cell including a plurality of header bytes and a plurality of payload bytes; and (c) coding the plurality of header bytes with header data, wherein the header data include:
  (i) a frame number for referencing the marker frame;
  (ii) a cell number for referencing the marker cell;
  (iii) a frame frequency marker;
  (iv) a time multiplexed cell indicator for indicating whether the marker cell is a time multiplexed cell; and
  (v) a packed mode indicator for indicating whether the marker cell is in a packed mode,
wherein the plurality of header bytes comprise 40 bits sequenced consecutively from header bit 0 to header bit 39,
the step of coding the plurality of header bytes including the step of assigning the time multiplexed cell indicator to header bit 13.

12. A method of sequencing a plurality of cells in a superframe consisting of a plurality of frames in a temporal sequence, the method comprising the steps of:

(a) assigning one of the frames as a marker frame, the marker frame including a plurality of time multiplexed cells and a plurality of asynchronous cells;

(b) assigning one of the time multiplexed cells in the marker frame as a marker cell, the marker cell including a plurality of header bytes and a plurality of payload bytes; and (c) coding the plurality of header bytes with header data, wherein the header data include:
  (i) a frame number for referencing the marker frame;
  (ii) a cell number for referencing the marker cell;
  (iii) a frame frequency marker;
  (iv) a time multiplexed cell indicator for indicating whether the marker cell is a time multiplexed cell; and
  (v) a packed mode indicator for indicating whether the marker cell is in a packed mode,
wherein the plurality of header bytes comprise 40 bits sequenced consecutively from header bit 0 to header bit 39,
the step of coding the plurality of header bytes including the step of assigning the packed mode indicator to header bit 27.

13. A method of sequencing a plurality of cells in the sulerframe consisting of a plurality of frames in a temporal sequence, the method comprising the steps of:

(a) assigning one of the frames as a marker frame, the marker frame including a plurality of time multiplexed cells and a plurality of asynchronous cells;

(b) assigning one of the time multiplexed cells in the marker frame as a marker cell, the marker cell including a plurality of header bytes and a plurality of payload bytes; and (c) coding the plurality of header bytes with header data, wherein the header bytes include eight virtual path identifier (VPI) bits and sixteen virtual channel indicator (VCI) bits, wherein the header data include:
  (i) a frame number for referencing the marker frame;
  (ii) a cell number for referencing the marker cell;
  (iii) a frame frequency marker;
  (iv) a time multiplexed cell indicator for indicating whether the marker cell is a time multiplexed cell; and
  (v) a packed mode indicator for indicating whether the marker cell is in a packed mode,
the step of coding the plurality of header bytes including the step of assigning the cell number to four of the VPI bits.

14. A method of sequencing a plurality of cells in the superframe consisting of a plurality of frames in a temporal sequence, the method comprising the steps of:

(a) assigning one of the frames as a marker frame, the marker frame including a plurality of time multiplexed cells and a plurality of asynchronous cells;

(b) assigning one of the time multiplexed cells in the marker frame as a marker cell, the marker cell including a plurality of header bytes and a plurality of payload bytes; and (c) coding the plurality of header bytes with header data, wherein the header bytes include eight virtual path identifier (VPI) bits and sixteen virtual channel indicator (VCI) bits,
wherein the header data include:
  (i) a frame number for referencing the marker frame;
  (ii) a cell number for referencing the marker cell;
  (iii) a frame frequency marker;
  (iv) a time multiplexed cell indicator for indicating whether the marker cell is a time multiplexed cell; and
  (v) a packed mode indicator for indicating whether the marker cell is in a packed mode,
the step of coding the plurality of header bytes including the step of assigning the frame number to four of the VPI bits.

15. A method of sequencing a plurality of cells in the superframe consisting of a plurality of frames in a temporal sequence, the method comprising the steps of:

(a) assigning one of the frames as a marker frame, the marker frame including a plurality of time multiplexed cells and a plurality of asynchronous cells;

(b) assigning one of the time multiplexed cells in the marker frame as a marker cell, the marker cell including a plurality of header bytes and a plurality of payload bytes; and (c) coding the plurality of header bytes with header data, wherein the header bytes include eight virtual path identifier (VPI) bits and sixteen virtual channel indicator (VCI) bits,
wherein the header data include:
  (i) a frame number for referencing the marker frame;
  (ii) a cell number for referencing the marker cell;
  (iii) a frame frequency marker;
  (iv) a time multiplexed cell indicator for indicating whether the marker cell is a time multiplexed cell; and
  (v) a packed mode indicator for indicating whether the marker cell is in a packed mode,
the step of coding the plurality of header bytes including the step of assigning the frame frequency marker to one of the VCI bits.

16. A method of sequencing a plurality of cells in the superframe consisting of a plurality of frames in a temporal sequence, the method comprising the steps of:

(a) assigning one of the frames as a marker frame, the marker frame including a plurality of time multiplexed cells and a plurality of asynchronous cells;

(b) assigning one of the time multiplexed cells in the marker frame as a marker cell, the marker cell including a plurality of header bytes and a plurality of payload bytes; and (c) coding the plurality of header bytes with header data, wherein the header bytes include eight virtual path identifier (VPI) bits and sixteen virtual channel indicator (VCI) bits, wherein the header data include:
  (i) a frame number for referencing the marker frame;
  (ii) a cell number for referencing the marker cell;
  (iii) a frame frequency marker;
  (iv) a time multiplexed cell indicator for indicating whether the marker cell is a time multiplexed cell; and
  (v) a packed mode indicator for indicating whether the marker cell is in a packed mode, the step of coding the plurality of header bytes including the step of assigning the time multiplexed cell indicator to one of the VCI bits.

17. A method of sequencing a plurality of cells in the superframe consisting of a plurality of frames in a temporal sequence, the method comprising the steps of:

(a) assigning one of the frames as a marker frame, the marker frame including a plurality of time multiplexed cells and a plurality of asynchronous cells;

(b) assigning one of the time multiplexed cells in the marker frame as a marker cell, the marker cell including a plurality of header bytes and a plurality of payload bytes; and (c) coding the plurality of header bytes with header data, wherein the header bytes include eight virtual path identifier (VPI) bits and sixteen virtual channel indicator (VCI) bits, wherein the header data include:
  (i) a frame number for referencing the marker frame;
  (ii) a cell number for referencing the marker cell;
  (iii) a frame frequency marker;
  (iv) a time multiplexed cell indicator for indicating whether the marker cell is a time multiplexed cell; and
  (v) a packed mode indicator for indicating whether the marker cell is in a packed mode, the step of coding the plurality of header bytes including the step of assigning the packed mode indicator to one of the VCI bits.

18. A method of sequencing a plurality of cells, comprising:

(a) providing a plurality of frames in a temporal sequence in a superframe, the frames including a last frame in the sequence;

(b) assigning the last frame as a marker frame, the marker frame including a plurality of time multiplexed cells and a plurality of asynchronous cells, the time multiplexed cells including a first time multiplexed cell;

(c) assigning the first time multiplexed cell as a marker cell, the marker cell including a plurality of header bytes and a plurality of payload bytes temporally subsequent to the plurality of header bytes; and (d) coding the plurality of header bytes with header data, where in the header data include:
  (i) a frame number for referencing the marker frame;
  (ii) a cell number for referencing the marker cell;
  (iii) a frame frequency marker;
  (iv) a time multiolexed cell indicator for indicating whether the marker cell is a time multiplexed cell; and
  (v) a packed mode indicator for indicating whether the marker cell is in a packed mode, wherein the plurality of header bytes comprise forty bits sequenced consecutively from header bit 0 to header bit 39, the step of coding the plurality of header bytes including the step of assigning the cell number to header bits 4–7.

19. The method of claim 18, wherein at least some of the plurality of asynchronous cells are temporally interspersed between the plurality of time multiplexed cells.

20. The method of claim 18, wherein the plurality of frames comprise a plurality of synchronous optical network (SONET) frames.

21. The method of claim 18, wherein the plurality of asynchronous cells comprise a plurality of asynchronous transfer mode (ATM) cells.

22. The method of claim 18, wherein the plurality of time multiplexed cells comprise a plurality of time division multiplex (TDM) cells.

23. The method of claim 18, wherein the plurality of header bytes comprise five header bytes.

24. A method of of sequencing a plurality of cells, comprising:

(a) providing a plurality of frames in a temporal sequence in a superframe, the frames including a last frame in the sequence;

(b) assigning the last frame as a marker frame, the marker frame including a plurality(of time multiplexed cells and a plurality of asynchronous cells, the time multiplexed cells including a first time multiplexed cell;

(c) assigning the first time multiplexed cell as a marker cell, the marker cell including a plurality of header bytes and a plurality of payload bytes temporally subsequent to the plurality of header bytes; and (d) coding the plurality of header bytes with header data, wherein the header data include:
  (i) a frame number for referencing the marker frame;
  (ii) a cell number for referencing the marker cell;
  (iii) a frame frequency marker;
  (iv) a time multiplexed cell indicator for indicating whether the marker cell is a time multiplexed cell; and
  (v) a packed mode indicator for indicating whether the marker cell is in a packed mode, wherein the plurality of header bytes comprise forty bits sequenced consecutively from header bit 0 to header bit 39, the step of coding the plurality of header bytes including the step of assigning the frame number to header bits 8–11.

25. A method of of sequencing a plurality of cells, comprising:

(a) providing a plurality of frames in a temporal sequence in a superframe, the frames including a last frame in the sequence;

(b) assigning the last frame as a marker frame, the marker frame including a plurality of time multiplexed cells and a plurality of asynchronous cells, the time multiplexed cells including a first time multiplexed cell;

(c) assigning the first time multiplexed cell as a marker cell, the marker cell including a plurality of header bytes and a plurality of payload bytes temporally subsequent to the plurality of header bytes; and (d) coding the plurality of header bytes with header data, wherein the header data include:
  (i) a frame number for referencing the marker frame;
  (ii) a cell number for referencing the marker cell;

(iii) a frame frequency marker;
(iv) a time multiplexed cell indicator for indicating whether the marker cell is a time multiplexed cell; and
(v) a packed mode indicator for indicating whether the marker cell is in a packed mode,
wherein the plurality of header bytes comprise forty bits sequenced consecutively from header bit 0 to header bit 39,
the step of coding the plurality of header bytes including the step of assigning the frame frequency marker to header bit 12.

26. A method of of sequencing a plurality of cells, comprising:
    (a) providing a plurality of frames in a temporal sequence in a superframe, the frames including a last frame in the sequence;
    (b) assigning the last frame as a marker frame, the marker frame including a plurality of time multiplexed cells and a plurality of asynchronous cells, the time multiplexed cells including a first time multiplexed cell;
    (c) assigning the first time multiplexed cell as a marker cell, the marker cell including a plurality of header bytes and a plurality of payload bytes temporally subsequent to the plurality of header bytes; and
    (d) coding the plurality of header bytes with header data, wherein the header data include:
        (i) a frame number for referencing the marker frame;
        (ii) a cell number for referencing the marker cell;
        (iii) a frame frequency marker;
        (iv) a time multiplexed cell indicator for indicating whether the marker cell is a time multiplexed cell; and
        (v) a packed mode indicator for indicating whether the marker cell is in a packed mode,
    wherein the plurality of header bytes comprise forty bits sequenced consecutively from header bit 0 to header bit 39,
    the step of coding the plurality of header bytes including the step of assigning the time multiplexed cell indicator to header bit 13.

27. A method of of sequencing a plurality of cells, comprising:
    (a) providing a plurality of frames in a temporal sequence in a superframe, the frames including a last frame in the sequence;
    (b) assigning the last frame as a marker frame, the marker frame including a plurality of time multiplexed cells and a plurality of asynchronous cells, the time multiplexed cells including a first time multiplexed cel;
    (c) assigning the first time multiplexed cell as a marker cell, the marker cell including a plurality of header bytes and a plurality of payload bytes temporally subsequent to the plurality of header bytes; and
    (d) coding the plurality of header bytes with header data, wherein the header data include:
        (i) a frame number for referencing the marker frame;
        (ii) a cell number for referencing the marker cell;
        (iii) a frame frequency marker;
        (iv) a time multiplexed cell indicator for indicating whether the marker cell is a time multiplexed cell; and
        (v) a packed mode indicator for indicating whether the marker cell is in a packed mode,
    wherein the plurality of header bytes comprise forty bits sequenced consecutively from header bit 0 to header bit 39,
    the step of coding the plurality of header bytes including the step of assigning the packed mode indicator to header bit 27.

28. A method of of sequencing a plurality of cells, comprising:
    (a) providing a plurality of frames in a temporal sequence in a superframe, the frames including a last frame in the sequence;
    (b) assigning the last frame as a marker frame, the marker frame including a plurality of time multiplexed cells and a plurality of asynchronous cells, the time multiplexed cells including a first time multiplexed cell;
    (c) assigning the first time multiplexed cell as a marker cell, the marker cell including a plurality of header bytes and a plurality of payload bytes temporally subsequent to the plurality of header bytes; and
    (d) coding the plurality of header bytes with header data, wherein the header data include:
        (i) a frame number for referencing the marker frame;
        (ii) a cell number for referencing the marker cell;
        (iii) a frame frequency marker;
        (iv) a time multiplexed cell indicator for indicating whether the marker cell is a time multiplexed cell; and
        (v) a packed mode indicator for indicating whether the marker cell is in a packed mode,
    wherein the header bytes include eight virtual path identifier (VPI) bits and sixteen virtual channel indicator (VCI) bits,
    the step of coding the plurality of header bytes including the step of assigning the cell number to four of the VPI bits.

29. A method of of sequencing a plurality of cells, comprising:
    (a) providing a plurality of frames in a temporal sequence in a superframe, the frames including a last frame in the sequence;
    (b) assigning the last frame as a marker frame, the marker frame including a plurality of time multiplexed cells and a plurality of asynchronous cells, the time multiplexed cells including a first time multiplexed cell;
    (c) assigning the first time multiplexed cell as a marker cell, the marker cell including a plurality of header bytes and a plurality of payload bytes temporally subsequent to the plurality of header bytes; and
    (d) coding the plurality of header bytes with header data, wherein the header data include:
        (i) a frame number for referencing the marker frame;
        (ii) a cell number for referencing the marker cell;
        (iii) a frame frequency marker;
        (iv) a time multiplexed cell indicator for indicating whether the marker cell is a time multiplexed cell; and
        (v) a packed mode indicator for indicating whether the marker cell is in a packed mode,
    wherein the header bytes include eight virtual path identifier (VPI) bits and sixteen virtual channel indicator (VCI) bits,
    the step of coding the plurality of header bytes including the step of assigning the frame number to four of the VPI bits.

30. A method of of sequencing a plurality of cells, comprising:
    (a) providing a plurality of frames in a temporal sequence in a superframe, the frames including a last frame in the sequence;

(b) assigning the last frame as a marker frame, the marker frame including a plurality of time multiplexed cells and a plurality of asynchronous cells, the time multiplexed cells including a first time multiplexed cell;

(c) assigning the first time multiplexed cell as a marker cell, the marker cell including a plurality of header bytes and a plurality of payload bytes temporally subsequent to the plurality of header bytes; and (d) coding the plurality of header bytes with header data, wherein the header data include:

(i) a frame number for referencing the marker frame;

(ii) a cell number for referencing the marker cell;

(iii) a frame frequency marker;

(iv) a time multiplexed cell indicator for indicating whether the marker cell is a time multiplexed cell; and (v) a packed mode indicator for indicating whether the marker cell is in a packed mode, wherein the header bytes include eight virtual path identifier (VPI) bits and sixteen virtual channel indicator (VCI) bits, the step of coding the plurality of header bytes including the step of assigning the frame frequency marker to one of the VCI bits.

31. A method of of sequencing a plurality of cells, comprising:

(a) providing a plurality of frames in a temporal sequence in a superframe, the frames including a last frame in the sequence;

(b) assigning the last frame as a marker frame, the marker frame including a plurality of time multiplexed cells and a plurality of asynchronous cells, the time multiplexed cells including a first time multiplexed cell;

(c) assigning the first time multiplexed cell as a marker cell, the marker cell including a plurality of header bytes and a plurality of payload bytes temporally subsequent to the plurality of header bytes; and (d) coding the plurality of header bytes with header data, wherein the header data include:

(i) a frame number for referencing the marker frame;

(ii) a cell number for referencing the marker cell;

(iii) a frame frequency marker;

(iv) a time multiplexed cell indicator for indicating whether the marker cell is a time multiplexed cell; and (v) a packed mode indicator for indicating whether the marker cell is in a packed mode, wherein the header bytes include eight virtual path identifier (VPI) bits and sixteen virtual channel indicator (VCI) bits, the step of coding the plurality of header bytes including the step of assigning the time multiplexed cell indicator to one of the VCI bits.

32. A method of of sequencing a plurality of cells, comprising:

(a) providing a plurality of frames in a temporal sequence in a superframe, the frames including a last frame in the sequence;

(b) assigning the last frame as a marker frame, the marker frame including a plurality of time multiplexed cells and a plurality of asynchronous cells, the time multiplexed cells including a first time multiplexed cell;

(c) assigning the first time multiplexed cell as a marker cell, the marker cell including a plurality of header bytes and a plurality of payload bytes temporally subsequent to the plurality of header bytes; and (d) coding the plurality of header bytes with header data, wherein the header data include:

(i) a frame number for referencing the marker frame;

(ii) a cell number for referencing the marker cell;

(iii) a frame frequency marker;

(iv) a time multiplexed cell indicator for indicating whether the marker cell is a time multiplexed cell; and (v) a packed mode indicator for indicating whether the marker cell is in a packed mode, wherein the header bytes include eight virtual path identifier (VPI) bits and sixteen virtual channel indicator (VCI) bits, the step of coding the plurality of header bytes including the step of assigning the packed mode indicator to one of the VCI bits.

33. A method of sequencing a plurality of cells, comprising:

(a) providing a plurality of synchronous optical network (SONET) frames in a temporal sequence in a superframe, the SONET frames including a last frame in the sequence;

(b) assigning the last SONET frame as a marker frame, the marker frame including a plurality of time division multiplex (TDM) cells and a plurality of asynchronous transfer mode (ATM) cells, the TDM cells including a first TDM cell;

(c) assigning the first TDM cell as a marker cell, the marker cell including a plurality of header bytes and a plurality of payload bytes temporally subsequent to the plurality of header bytes; and (d) coding the plurality of header bytes with header data including:

(i) a cell number for referencing the marker cell;

(ii) a frame number for referencing the marker frame;

(iii) a SONET frame frequency marker;

(iv) a TDM cell indicator for indicating whether the marker cell in the SONET frame is a TDM cell; and (v) a packed mode indicator for indicating whether the marker cell is in a packed mode, wherein the plurality of header bytes comprise 40 bits sequenced consecutively from header bit 0 to header bit 39, the step of coding the plurality of header bytes including the step of assigning the cell number to header bits 4–7.

34. The method of claim 33, wherein at least some of the plurality of ATM cells are temporally interspersed between the plurality of TDM cells.

35. The method of claim 33, wherein the step of coding the plurality of header bytes further includes the step of assigning the frame number to header bits 8–11.

36. The method of claim 33, wherein the step of coding the plurality of header bytes further includes the step of assigning the SONET frame frequency marker to header bit 12.

37. The method of claim 33, wherein the step of coding the plurality of header bytes further includes the step of assigning the TDM cell indicator to header bit 13.

38. The method of claim 33, wherein the step of coding the plurality of header bytes further includes the step of assigning the packed mode indicator to header bit 27.

39. The method of claim 33, wherein the header bytes include eight virtual path identifier (VPI) bits and sixteen virtual channel indicator (VCI) bits.

40. The method of claim 39, wherein the step of coding the plurality of header bytes further includes the step of assigning the cell number to four of the VPI bits.

41. The method of claim 39, wherein the step of coding the plurality of header bytes further includes the step of assigning the frame number to four of the VPI bits.

42. The method of claim 39, wherein the step of coding the plurality of header bytes further includes the step of assigning the SONET frame frequency marker to one of the VCI bits.

43. The method of claim 39, wherein the step of coding the plurality of header bytes further includes the step of assigning the TDM cell indicator to one of the VCI bits.

44. The method of claim 39, wherein the step of coding the plurality of header bytes further includes the step of assigning the packed mode indicator to one of the VCI bits.

45. A method of sequencing a plurality of cells in a superframe consisting of a plurality of frames each occupying a position in a frame sequence, the frames each comprising a plurality of time multiplexed cells and a plurality of asynchronous cells each occupying a position in a cell sequence, each time multiplexed cell including a plurality of header bits, the method comprising the steps of:

(a) coding at least one of the header bits with a delay control;

(b) coding some of the header bits with a frame number for referencing the position of the frame in the frame sequence;

(c) coding some of the header bits with an upstream identifier for identifying the position of the cell in the cell sequence in an upstream direction;

(d) coding some of the header bits with a downstream identifier for identifying the position of the cell in the cell sequence in a downstream direction; and (e) coding at least one of the header bits with a time multiplexed cell indicator for indicating whether the cell is a time multiplexed cell, wherein the header bits consist of forty header bits numbered consecutively from header bit 0 to header bit 39, the step of coding at least one of the header bits with the delay control comprising the step of assigning header bit 0 as a delay control bit.

46. The method of claim 45, further comprising the step of assigning some of the header bits as header error checking bits.

47. A method of sequencing a plurality of cells in a superframe consisting of a plurality of frames each occupying a position in a frame sequence, the frames each comprising a plurality of time multiplexed cells and a plurality of asynchronous cells each occupying a position in a cell sequence, each time multiplexed cell including a plurality of header bits, the method comprising the steps of:

(a) coding at least one of the header bits with a delay control;

(b) coding some of the header bits with a frame number for referencing the position of the frame in the frame sequence;

(c) coding some of the header bits with an upstream identifier for identifying the position of the cell in the cell sequence in an upstream direction;

(d) coding some of the header bits with a downstream identifier for identifying the position of the cell in the cell sequence in a downstream direction; and (e) coding at least one of the header bits with a time multiplexed cell indicator for indicating whether the cell is a time multiplexed cell, wherein the header bits consist of forty header bits numbered consecutively from header bit 0 to header bit 39, the step of coding some of the header bits with the frame number comprising the step of assigning header bits 1–3 as frame bits.

48. A method of sequencing a plurality of cells in a superframe consisting of a plurality of frames each occupying a position in a frame sequence, the frames each comprising a plurality of time multiplexed cells and a plurality of asynchronous cells each occupying a position in a cell sequence, each time multiplexed cell including a plurality of header bits, the method comprising the steps of:

(a) coding at least one of the header bits with a delay control;

(b) coding some of the header bits with a frame number for referencing the position of the frame in the frame sequence;

(c) coding some of the header bits with an upstream identifier for identifying the position of the cell in the cell sequence in an upstream direction;

(d) coding some of the header bits with a downstream identifier for identifying the position of the cell in the cell sequence in a downstream direction; and (e) coding at least one of the header bits with a time multiplexed cell indicator for indicating whether the cell is a time multiplexed cell, wherein the header bits consist of forty header bits numbered consecutively from header bit 0 to header bit 39, the step of coding some of the header bits with the upstream identifier comprising the step of assigning header bits 4–7 as upstream identifier bits.

49. A method of sequencing a plurality of cells in a superframe consisting of a plurality of frames each occupying a position in a frame sequence, the frames each comprising a plurality of time multiplexed cells and a plurality of asynchronous cells each occupying a position in a cell sequence, each time multiplexed cell including a plurality of header bits, the method comprising the steps of:

(a) coding at least one of the header bits with a delay control;

(b) coding some of the header bits with a frame number for referencing the position of the frame in the frame sequence;

(c) coding some of the header bits with an upstream identifier for identifying the position of the cell in the cell sequence in an upstream direction;

(d) coding some of the header bits with a downstream identifier for identifying the position of the cell in the cell sequence in a downstream direction; and (e) coding at least one of the header bits with a time multiplexed cell indicator for indicating whether the cell is a time multiplexed cell, wherein the header bits consist of forty header bits numbered consecutively from header bit 0 to header bit 39, the step of coding some of the header bits with the downstream identifier comprising the step of assigning header bits 8–11 as downstream identifier bits.

50. A method of sequencing a plurality of cells in a superframe consisting of a plurality of frames each occupying a position in a frame sequence, the frames each comprising a plurality of time multiplexed cells and a plurality of asynchronous cells each occupying a position in a cell sequence, each time multiplexed cell including a plurality of header bits, the method comprising the steps of:

(a) coding at least one of the header bits with a delay control;

(b) coding some of the header bits with a frame number for referencing the position of the frame in the frame sequence;

(c) coding some of the header bits with an upstream identifier for identifying the position of the cell in the cell sequence in an upstream direction;

(d) coding some of the header bits with a downstream identifier for identifying the position of the cell in the cell sequence in a downstream direction; and (e) coding at least one of the header bits with a time multiplexed cell indicator for indicating whether the cell is a time multiplexed cell, wherein the header bits consist of forty header bits numbered consecutively from header bit 0 to header bit 39, the step of coding at least one of the header bits with the time multiplexed cell indicator comprising the step of assigning header bit 12 as a time multiplexed cell indicator bit.

51. The method of claim 50, further comprising the step of assigning header bits 32–39 as header error checking bits.

52. A method of sequencing a plurality of cells in a superframe consisting of a plurality of frames each occupying a position in a frame sequence, the frames each comprising a plurality of time multiplexed cells and a plurality of asynchronous cells each occupying a position in a cell sequence, each time multiplexed cell including a plurality of header bits, the method comprising the steps of:

(a) coding at least one of the header bits with a delay control;

(b) coding some of the header bits with a frame number for referencing the position of the frame in the frame sequence;

(c) coding some of the header bits with an upstream identifier for identifying the position of the cell in the cell sequence in an upstream direction;

(d) coding some of the header bits with a downstream identifier for identifying the position of the cell in the cell sequence in a downstream direction; and (e) coding at least one of the header bits with a time multiplexed cell indicator for indicating whether the cell is a time multiplexed cell, wherein the header bits include a plurality of generic flow control (GFC) bits, a plurality of virtual path identifier (VPI) bits, and a plurality of virtual channel indicator (VCI) bits, the step of coding some of the header bits with the frame number comprising the step of assigning three of the GFC bits as frame bits.

53. A method of sequencing a plurality of cells in a superframe consisting of a plurality of frames each occupying a position in a frame sequence, the frames each comprising a plurality of time multiplexed cells and a plurality of asynchronous cells each occupying a position in a cell sequence, each time multiplexed cell including a plurality of header bits, the method comprising the steps of:

(a) coding at least one of the header bits with a delay control;

(b) coding some of the header bits with a frame number for referencing the position of the frame in the frame sequence;

(c) coding some of the header bits with an upstream identifier for identifying the position of the cell in the cell sequence in an upstream direction;

(d) coding some of the header bits with a downstream identifier for identifying the position of the cell in the cell sequence in a downstream direction; and (e) coding at least one of the header bits with a time multiplexed cell indicator for indicating whether the cell is a time multiplexed cell, wherein the header bits include a plurality of generic flow control (GFC) bits, a plurality of virtual path identifier (VPI) bits, and a plurality of virtual channel indicator (VCI) bits, the step of coding some of the header bits with the upstream identifier comprising the step of assigning four of the VPI bits as upstream identifier bits.

54. A method of sequencing a plurality of cells in a superframe consisting of a plurality of frames each occupying a position in a frame sequence, the frames each comprising a plurality of time multiplexed cells and a plurality of asynchronous cells each occupying a position in a cell sequence, each time multiplexed cell including a plurality of header bits, the method comprising the steps of:

(a) coding at least one of the header bits with a delay control;

(b) coding some of the header bits with a frame number for referencing the position of the frame in the frame sequence;

(c) coding some of the header bits with an upstream identifier for identifying the position of the cell in the cell sequence in an upstream direction;

(d) coding some of the header bits with a downstream identifier for identifying the position of the cell in the cell sequence in a downstream direction; and (e) coding at least one of the header bits with a time multiplexed cell indicator for indicating whether the cell is a time multiplexed cell, wherein the header bits include a plurality of generic flow control (GFC) bits, a plurality of virtual path identifier (VPI) bits, and a plurality of virtual channel indicator (VCI) bits, the step of coding some of the header bits with the downstream identifier comprising the step of assigning four of the VPI bits as downstream identifier bits.

55. A method of sequencing a plurality of cells in a superframe consisting of a plurality of frames each occupying a position in a frame sequence, the frames each comprising a plurality of time multiplexed cells and a plurality of asynchronous cells each occupying a position in a cell sequence, each time multiplexed cell including a plurality of header bits, the method comprising the steps of:

(a) coding at least one of the header bits with a delay control;

(b) coding some of the header bits with a frame number for referencing the position of the frame in the frame sequence;

(c) coding some of the header bits with an upstream identifier for identifying the position of the cell in the cell sequence in an upstream direction;

(d) coding some of the header bits with a downstream identifier for identifying the position of the cell in the cell sequence in a downstream direction; and (e) coding at least one of the header bits with a time multiplexed cell indicator for indicating whether the cell is a time multiplexed cell, wherein the header bits include a plurality of generic flow control (GFC) bits, a plurality of virtual path identifier (VPI) bits, and a plurality of virtual channel indicator (VCI) bits, the step of coding at least one of the header bits with the time multiplexed cell indicator comprising the step of assigning one of the VCI bits as a time multiplexed cell indicator bit.

56. The method of claim 52, further comprising the step of assigning some of the header bits as header error checksum (HEC) bits.

57. The method of claim 45, wherein the plurality of frames comprise a plurality of synchronous optical network (SONET) frames.

58. The method of claim 45, wherein the plurality of asynchronous cells comprise a plurality of asynchronous transfer mode (ATM) cells.

59. The method of claim 45, wherein the plurality of time multiplexed cells comprise a plurality of time division multiplex (TDM) cells.

* * * * *